United States Patent
Kirsch et al.

(10) Patent No.: US 9,944,228 B2
(45) Date of Patent: *Apr. 17, 2018

(54) SYSTEM AND METHOD FOR VEHICLE CONTROL INTEGRATING HEALTH PRIORITY ALERTS OF VEHICLE OCCUPANTS

(71) Applicant: Honda Motor Co., Ltd., Tokyo (JP)

(72) Inventors: David M. Kirsch, Torrance, CA (US); Bonnie Chen, Torrance, CA (US); Harinkumar Vashi, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 15/186,582

(22) Filed: Jun. 20, 2016

(65) Prior Publication Data

US 2016/0297359 A1    Oct. 13, 2016

Related U.S. Application Data (63) Continuation of application No. 14/557,508, filed on Dec. 2, 2014, now Pat. No. 9,399,430.

(51) Int. Cl.

| | |
|---|---|
| G06F 7/00 | (2006.01) |
| B60Q 9/00 | (2006.01) |
| B60Q 1/00 | (2006.01) |
| B60Q 1/04 | (2006.01) |
| B60Q 1/34 | (2006.01) |
| B60K 35/00 | (2006.01) |
| B60W 40/08 | (2012.01) |
| B60Q 1/52 | (2006.01) |

(52) U.S. Cl.
CPC .............. *B60Q 9/00* (2013.01); *B60K 35/00* (2013.01); *B60Q 1/00* (2013.01); *B60Q 1/04* (2013.01); *B60Q 1/346* (2013.01); *B60Q 1/52* (2013.01); *B60W 40/08* (2013.01)

(58) Field of Classification Search
CPC ... B60Q 9/00; B60Q 1/00; B60Q 1/04; B60Q 1/346; B60K 35/00; B60W 40/08
USPC ...... 701/36, 1, 45, 48; 340/539.12, 575, 576
See application file for complete search history.

(56) References Cited

U.S. PATENT DOCUMENTS

| | | | |
|---|---|---|---|
| 8,040,246 B2 | 10/2011 | Graves et al. | |
| 8,405,502 B2 * | 3/2013 | Teague ................ | A61B 5/0024 340/286.02 |

(Continued)

*Primary Examiner* — Thomas G Black
*Assistant Examiner* — Luat T Huynh
(74) *Attorney, Agent, or Firm* — Rankin, Hill & Clark LLP (57) ABSTRACT

A method for vehicle control includes receiving physiological data from one or more wearable computing devices, where each of the one or more wearable computing devices is associated with one or more vehicle occupants in the vehicle, and determining a health state of the one or more vehicle occupants based on the physiological data. The health state describing a current condition of each of the one or more vehicle occupants. The method includes determining a priority level for the health state of each of the one or more vehicle occupants. Further, the method includes controlling one or more vehicle systems of the vehicle based on the health state of each of the one or more vehicle occupants and according to the priority level of the health state of each of the one or more vehicle occupants.

20 Claims, 5 Drawing Sheets

(56) References Cited

U.S. PATENT DOCUMENTS

| | | | | |
|---|---|---|---|---|
| 8,704,669 | B2* | 4/2014 | Strumolo | B60H 1/00771 |
| | | | | 340/438 |
| 9,399,430 | B2* | 7/2016 | Kirsch | B60Q 9/00 |
| 2010/0268051 | A1* | 10/2010 | Prasad | A61B 5/0002 |
| | | | | 600/365 |
| 2012/0171982 | A1 | 7/2012 | Schunder et al. | |
| 2012/0256749 | A1 | 10/2012 | Rao et al. | |
| 2012/0296567 | A1 | 11/2012 | Breed | |
| 2014/0059066 | A1 | 2/2014 | Koloskov | |
| 2014/0179256 | A1 | 6/2014 | Strumolo | |
| 2014/0309864 | A1* | 10/2014 | Ricci | H04W 48/04 |
| | | | | 701/36 |
| 2015/0127215 | A1* | 5/2015 | Chatterjee | H04W 4/001 |
| | | | | 701/36 |
| 2015/0149018 | A1* | 5/2015 | Attard | G05D 1/0061 |
| | | | | 701/23 |
| 2016/0016454 | A1* | 1/2016 | Yang | B60H 1/00742 |
| | | | | 701/36 |

* cited by examiner

SYSTEM AND METHOD FOR VEHICLE CONTROL INTEGRATING HEALTH PRIORITY ALERTS OF VEHICLE OCCUPANTS

RELATED APPLICATIONS

This application is a continuation of and claims priority to U.S. patent application Ser. No. 14/557,508, filed on Dec. 2, 2014, which is expressly incorporated herein by reference.

BACKGROUND

Wearable technologies and other portable computing devices can be integrated across different domains and fields for data acquisition on aspects of a user's daily life. In particular, wearable technologies including wearable sensors can monitor and assess biometric data, user states, user activity, user motion, sleep cycles, and other inputs a user encounters on a daily basis.

Within a vehicle context, data from wearable technologies can be used, in part, to determine states and behaviors of vehicle occupants. In particular, physiological data from wearable technologies and the vehicle can provide information on the health of vehicle occupants. In an emergency situation, for example, after a vehicle accident or if a vehicle occupant is showing signs of a health event, accurate information on the health of each vehicle occupant can be used to provide an appropriate response.

BRIEF DESCRIPTION

According to one aspect, a computer-implemented method for vehicle control integrating health priority alerts of vehicle occupants includes connecting one or more wearable computing devices, each associated with one or more vehicle occupants, to a vehicle. The method includes receiving physiological data associated with the one or more vehicle occupants from at least one of the one or more wearable computing devices and vehicles sensors of the vehicle and detecting a trigger event based on at least one of the physiological data and vehicle data. The vehicle data is received from one or more vehicle systems of the vehicle. The method includes determining a health state of each of the one or more vehicle occupants based on the physiological data. The health state describes a current condition of each of the one or more vehicle occupants. The method includes determining a priority level for the health state of each of the one or more vehicle occupants, and controlling the one or more vehicle systems of the vehicle to provide an indication of the health state according to the priority level and a location of each of the one or more vehicle occupants.

According to another aspect, a system for vehicle control integrating health priority alerts of vehicle occupants includes one or more wearable computing devices each associated with one or more vehicle occupants and a vehicle including one or more vehicle systems, one or more vehicle sensors and a processor, the processor operably connected for computer communication to the one or more wearable computing devices. The system includes a data receiving module of the processor receives physiological data associated with the one or more vehicle occupants from at least one of the one or more wearable computing devices and the one or more vehicles sensors. The system includes a trigger event module of the processor detects a trigger event based on at least one of the physiological data and vehicle data. The vehicle data is received from the one or more vehicle systems of the vehicle. The system includes a health prioritization module of the processor determines a health state of each of the one or more vehicle occupants based on the physiological data. The health state describes a current condition of each of the one or more vehicle occupants. The health prioritization module also determines a priority level for the health state of each of the one or more vehicle occupants. The system includes a vehicle control module of the processor controls one or more vehicle systems of the vehicle to provide an indication of the health state according to the priority level and a location of the one or more vehicle occupants.

According to a further aspect, a non-transitory computer-readable storage medium storing instructions that, when executed by a computer, causes the computer to perform a method. The method in includes initializing a connection for computer communication between one or more wearable computing devices, each associated with one or more vehicle occupants, and a vehicle. The method includes receiving physiological data associated with the one or more vehicle occupants from at least one of the one or more wearable computing devices and vehicles sensors of the vehicle. The method includes detecting a trigger event based on at least one of the physiological data and vehicle data. The vehicle data is received from one or more vehicle systems of the vehicle. The method includes determining a health state of each of the one or more vehicle occupants based on the physiological data. The health state describes a current condition of each of the one or more vehicle occupants. The method includes determining a priority level of each of the health states of each of the one or more vehicle occupants and transmitting one or more vehicle commands to the vehicle to control one or more vehicle systems of the vehicle thereby providing an indication of the health state according to the priority level and a location of the one or more vehicle occupants.

DETAILED DESCRIPTION

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device," as used herein, is a computing device typically having a display screen with user input (e.g., touch, keyboard) and a processor for computing. Portable devices include, but are not limited to, handheld devices, mobile devices, smart phones, laptops, tablets, and e-readers. In some embodiments, a "portable device" could refer to a remote device that includes a processor for computing and/or a communication interface for receiving and transmitting data remotely.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, leashes, collars, shoes, earbuds, headphones and personal wellness devices.

Figure 1:
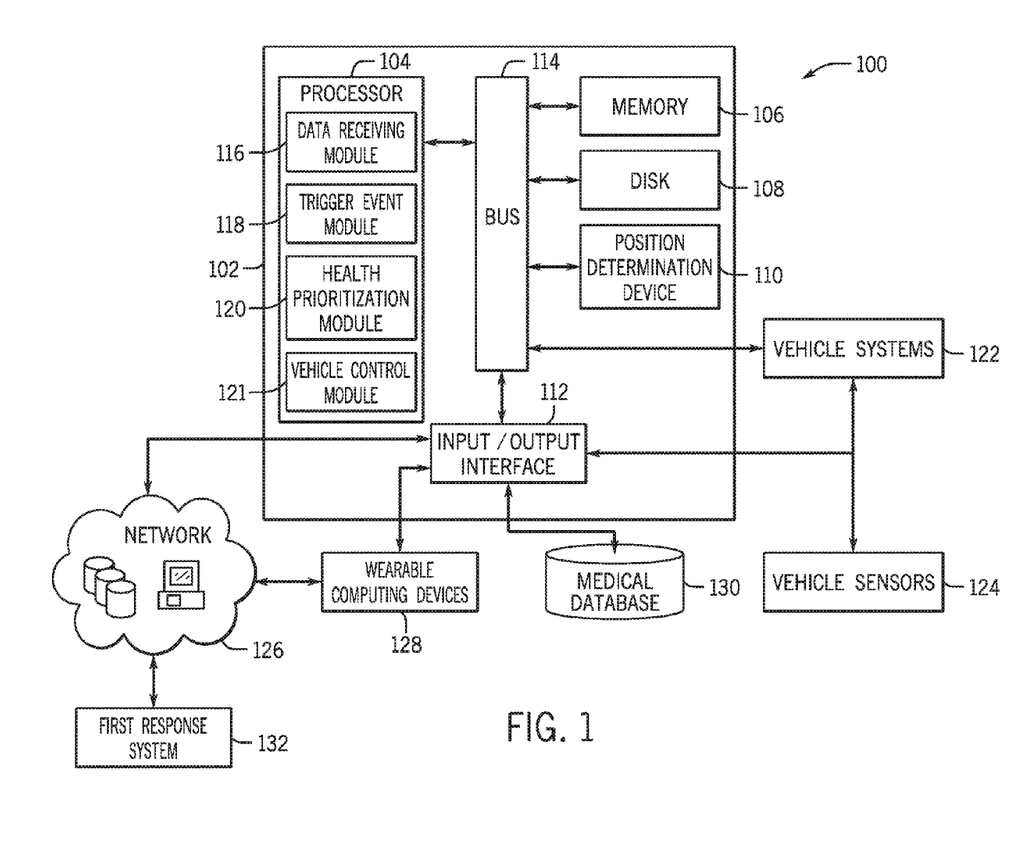
FIG. 1 is a schematic diagram of an operating environment for implementing systems and methods for vehicle control integrating health priority alerts of vehicle occupants according to an exemplary embodiment.
Figure 2:
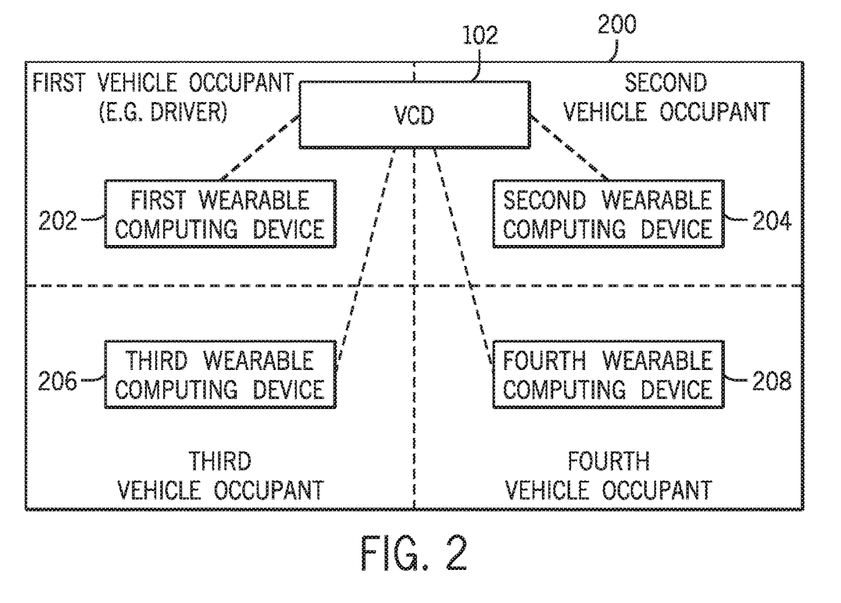
FIG. 2 is a schematic diagram of a vehicle implementing a system for vehicle control integrating health priority alerts of vehicle occupants according to an exemplary embodiment.

Generally, the systems and methods disclosed herein are directed to vehicle control integrating data from the vehicle and wearable computing devices associated with the vehicle occupants in the vehicle to provide health alerts and priority information to, for example, first responders in an emergency situation. Referring now to the drawings, wherein the showings are for purposes of illustrating one or more exemplary embodiments and not for purposes of limiting same, FIG. 1 is a schematic diagram of an operating environment 100 for implementing systems and methods for vehicle control integrating health priority alerts of vehicle occupants. The components of environment 100, as well as the components of other systems, hardware architectures, and software architectures discussed herein, can be combined, omitted, or organized into different architectures for various embodiments. Further, the components of the operating environment 100 can be implemented with or associated with a vehicle. For example, FIG. 2 is a schematic diagram of a vehicle 200 implementing systems and methods for vehicle control integrating health priority alerts of vehicle occupants according to an exemplary embodiment.

In the illustrated embodiment of FIG. 1, the environment 100 includes a vehicle computing device 102 (VCD) with provisions for processing, communicating and interacting with various components of a vehicle and other components of the environment 100. In one embodiment, the VCD 102 can be implemented with the vehicle 200 (FIG. 2), for example, as part of a telematics unit, a head unit, a navigation unit, an infotainment unit, an electronic control unit, among others. In other embodiments, the components and functions of the VCD 102 can be implemented remotely from the vehicle 102, for example, with a portable device (not shown) or another device connected via a network (e.g., a network 126).

Generally, the VCD 102 includes a processor 104, a memory 106, a disk 108, a position determination device 110, and an input/output (I/O) interface 112, which are each operably connected for computer communication via a bus 114 and/or other wired and wireless technologies. The I/O interface 112 provides software and hardware to facilitate data input and output between the components of the VCD 102 and other components, networks, and data sources, which will be described herein. Additionally, the processor 104 includes a data receiving module 116, a trigger event module 118, a health prioritization module 120, and a vehicle control module 121, each suitable for providing vehicle control integrating health priority alerts of vehicle occupants facilitated by the components of the environment 100.

Figure 3:
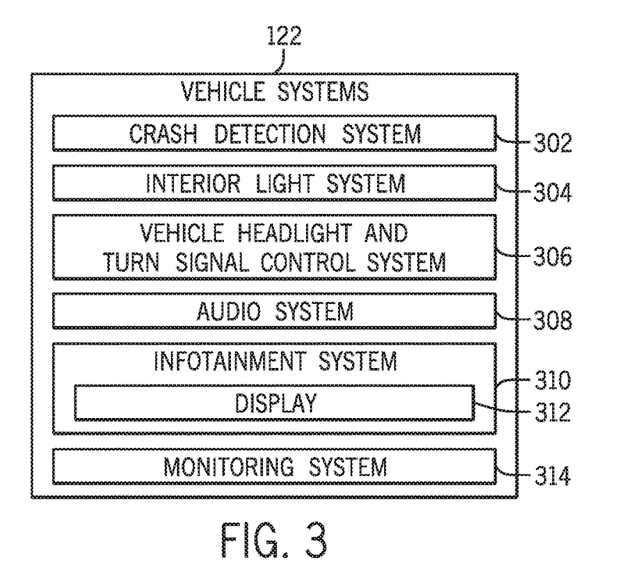
FIG. 3 is a schematic diagram of exemplary vehicle systems according to an exemplary embodiment.

The VCD 102 is also operably connected for computer communication (e.g., via the bus 114 and/or the I/O interface 112) to one or more vehicle systems 122. Vehicle systems can include, but are not limited to, any automatic or manual systems that can be used to enhance the vehicle, driving, and/or safety. FIG. 3 illustrates various different vehicle systems 122 according to an exemplary embodiment. It is understood that the vehicle systems shown in FIG. 3 are exemplary in nature and other vehicle systems can be implemented with the systems and methods discussed herein. In the embodiment shown in FIG. 3, the vehicle systems 122 can include a crash detection system 302 for detecting, for example, a vehicle accident. The vehicle systems 122 can include an interior light system 304 to control, for example, interior vehicle cabin lights (not shown).

Additionally, the vehicle systems 122 can include a vehicle headlight and turn signal control system 306 for controlling lighting (e.g., head lights, flood lights) and signaling devices (e.g., turn signals, blind spot indicators) mounted on various locations of the vehicle, for example, front, side, rear, the top of the vehicle, the side mirrors, among others. The vehicle systems 122 can also include an audio system 308 that controls audio (e.g., audio content, volume) in the vehicle. Further, the vehicle systems 122 can include an infotainment system 310. The infotainment system 310 can include an in-vehicle display 312. In some embodiments, which will be discussed in more detail herein, the vehicle systems 122 can be controlled to indicate a health state of each of the one or more vehicle occupants.

Further, the vehicle systems 122 in the embodiment shown in FIG. 3 can include a monitoring system 314. The monitoring system 314 can include various sensors (e.g., vehicle sensors 124) for monitoring one or more vehicle occupants, and in particular, monitoring physiological data of the one or more vehicle occupants. In one embodiment, the monitoring system 314 can be operably connected for computer communication to one or more wearable computing devices 128 (FIG. 1).

Referring again to FIG. 1, and as mentioned above, the vehicle systems 122 include and/or are operably connected for computer communication to various vehicle sensors 124. The vehicle sensors 124 provide and/or sense information associated with one or more vehicle occupants (e.g., via the monitoring system 314 of FIG. 3), the vehicle, the vehicle environment, and/or the vehicle systems 122. It is understood that the vehicle sensors can include, but are not limited to, the vehicle sensors 124 associated with the vehicle systems 122 and other vehicle sensors associated with the vehicle. Specific vehicle system sensors can include, but are not limited to, vehicle speed sensors, accelerator pedal sensors, brake sensors, throttle position sensors, wheel sensors, anti-lock brake sensors, camshaft sensors, among others. Other vehicle sensors can include, but are not limited to, cameras mounted to the interior or exterior of the vehicle and radar and laser sensors mounted to the exterior of the vehicle. Further, vehicle sensors can include sensors external to the vehicle (accessed, for example, via the network 126), for example, external cameras, radar and laser sensors on other vehicles in a vehicle-to-vehicle network, street cameras, surveillance cameras, among others.

The vehicle sensors 124 are operable to sense a measurement of data associated with the vehicle, the vehicle environment, the vehicle systems 122, and/or occupants of the vehicle, and generate a data signal indicating said measurement of data. These data signals can be converted into other data formats (e.g., numerical) and/or used by the vehicle systems 122 and/or the VCD 102 to generate other data metrics and parameters. It is understood that the sensors can be any type of sensor, for example, acoustic, electric, environmental, optical, imaging, light, pressure, force, thermal, temperature, proximity, among others.

The VCD 102 is also operatively connected for computer communication to the network 126, the one or more wearable computing devices 128, and a medical database 130. It is understood that the connection from the I/O interface 112 to the network 126, the one or more wearable computing devices 128, and the medical database 130 can be facilitated in various ways. For example, through a network connection (e.g., wired or wireless), a cellular data network from a portable device (not shown) or a wearable computing device 128, a vehicle to vehicle ad-hoc network (not shown), an in-vehicle network (not shown), among others, or any combination of thereof.

The network 126 is, for example, a data network, the Internet, a wide area network or a local area network. The network 126 serves as a communication medium to various remote devices (e.g., databases, web servers, remote servers, application servers, intermediary servers, client machines, other portable devices). It is understood that in some embodiments, the one or more wearable computing devices 128 can be included in the network 126, accessed by the VCD 102 through the network 126, and/or the network 126 can access the one or more wearable computing devices 128. Thus, in some embodiments, the VCD 102 can obtain data from the one or more wearable computing devices 128 via the network 126. The medical database 130 can be accessed and/or located in a similar manner.

Further, in FIG. 1, the network 126 can provide access between the VCD 102 and a first response system 132. A first response system 132 can include public and private emergency medical services, security systems, medical alert systems, among others. In some embodiments, the VCD 102 can directly communicate with the first response system 132. As will be discussed in further detail herein, information about the health state of each of the vehicle occupants can be communicated from the VCD 102 to the first response system 132. Further, it is understood, that in some embodiments, the first response system 132 can host the medical database 130.

As mentioned above, the one or more wearable computing devices 128 generally provide data to the VCD 102, the data being associated with the user wearing or associated with the wearable device 128. As discussed above, it is understood that the one or more wearable devices 128 can include, but are not limited to, a computing device component (e.g., a processor) with circuitry that can be worn or attached to user. In some embodiments, the one or more wearable devices 128 could also include a portable device (e.g., a mobile device, a portable medical device).

The one or more wearable devices 128 as operably connected for computer communication to a vehicle are further illustrated in FIG. 2. The vehicle 200 can include the VCD 102 of FIG. 1. As shown in FIG. 2, the system and methods described herein can include one or more wearable computing devices that are each operably connected for computer communication to the VCD 102. For example, in FIG. 2, the VCD 102 is operably connected for computer communication to a first wearable computing device 202, associated with a driver (e.g., a first vehicle occupant); a second wearable computing device 204 associated with a second vehicle occupant; a third wearable computing device 206 associated with a third vehicle occupant; and a fourth wearable computing device 208 associated with a fourth vehicle occupant. It is understood that the systems and methods disclosed herein can include any number of vehicle occupants and wearable computing devices. Further, in some embodiments, the wearable computing device can include a device ID, which can be transmitted to the VCD 102 and used by the VCD 102 to identify the vehicle occupant associated with the wearable computing device.

The medical database 130 can include health and medical information about medical conditions, disease, symptoms, medications, among others. The medical database 130 can be used to determine information about a particular health state and/or the severity of a health state. Further, in some embodiments, the medical database 130 can include medical information associated with the one or more vehicle occupants. For example, the medical database 130 can include historical physiological and/or historical behavioral data, normative baseline data, medical profile information, medical history, current health conditions, current medications, among others. In some embodiments, the medical database 130 can be updated with medical information associated with the one or more vehicle occupants by the VCD 102 and/or the wearable devices 128 on a periodic basis. Thus, medical database 130 can aggregate data from the VCD 102 and/or the wearable computing devices 128.

It is understood that the medical database 130 can be located remotely from the VCD 102 and accessed, for example, by the network 126. It some embodiments, the medical database 130 could be located on-board the vehicle, at for example, the memory 106 and/or the disk 108. Further, in some embodiments, the medical database 130 could be located on a memory or a disk (not shown) integrated with the wearable computing devices 128. In other embodiments, the medical database 130 could be distributed in one or more locations.

The system shown in FIG. 1 will now be described in operation according to an exemplary embodiment. As mentioned above, and as shown in detail in FIG. 2, the system includes one or more wearable computing devices 128 each associated with one or more vehicle occupants. The system also includes a vehicle (e.g., the vehicle 200 of FIG. 2), with one or more vehicle systems 122 and one or more vehicle sensors 124. The vehicle also includes the processor 104. The data receiving module 116 of the processor 104 receives physiological data associated with the one or more vehicle occupants from at least one of the one or more wearable computing devices and the one or more vehicles sensors.

Physiological data can include, but is not limited to, heart information, such as, heart rate, heart rate pattern, blood pressure, oxygen content, among others. Physiological data can also include brain information, such as, electroencephalogram (EEG) measurements, functional near infrared spectroscopy (fNIRS), functional magnetic resonance imaging (fMRI), among others. Physiological data can also include digestion information, respiration rate information, salivation information, perspiration information, pupil dilation information, body temperature, muscle strain, as well as other kinds of information related to the autonomic nervous system or other biological systems of the vehicle occupant. In some embodiments, physiological data can also include behavioral data, for example, mouth movements, facial movements, facial recognition, head movements, body movements, hand postures, hand placement, body posture, gesture recognition, among others.

Physiological data can also include recognition data (e.g., biometric identification) used to identify the vehicle occupant. For example, recognition data can include a predetermined heart rate pattern associated with a vehicle occupant, eye scan data associated with a vehicle occupant, fingerprint data associated with a vehicle occupant, among other types of recognition data. It is appreciated that the recognition data and other types of physiological data can be stored at various locations (e.g., the disk 108, a memory integrated with the wearable computing devices 128, the medical database 130) and accessed by the VCD 102.

The VCD 102 can receive and/or access the physiological data from different sources. In one embodiment, the data receiving module 116 receives the physiological data from at least one of the wearable computing devices 128 and the vehicle 200 (e.g., the vehicle systems 122, the vehicle sensors 124). For example, the wearable devices 128 can include sensors for sensing and determining various parameters of a user, for example, location, motion, and physiological parameters, among others. In one embodiment, the sensors include bio-sensors for sensing physiological data and other data associated with the body and biological systems of the vehicle occupant. Additionally, it is appreciated that some physiological data can be sensed and/or determined by the one or more wearable devices 128 using gesture tracking and/or recognition implemented by the wearable devices 128.

Further, the monitoring system 314 of FIG. 3 can sense and determine physiological data of one or more vehicle occupants. For example, the monitoring system 314 can include one or more bio-monitoring sensors, heart rate sensors, blood pressure sensors, oxygen content sensors, respiratory sensors, perspiration sensors, imaging sensors to sense eye movement, pupil dilation, gestures, as well as any other kinds of sensors for monitoring one or more vehicle occupants (e.g., vehicle sensors 124). It is understood that said sensors of the monitoring system 314 can be disposed in any location of a vehicle (e.g., the vehicle 200, FIG. 2). For example, sensors can be disposed in a steering wheel, seat, armrest or other component to detect physiological data associated with the one or more vehicle occupants.

It is understood that physiological data can be obtained from both the wearable computing devices 128 and the monitoring system 314. Further, the physiological data from both the wearable computing devices 128 and/or the monitoring system 314 can be received in real time or stored and aggregated at the wearable device 128, the monitoring system 202 and/or a remote server accessed through the network 124, for example, the medical database 130. It is understood that the one or more wearable devices 128 and/or the monitoring system 202 can obtain other types of data associated with the user by accessing local or remotely stored data or data through a network connection (e.g., the network 126). For example, the wearable devices 128 can include data on other inputs a vehicle occupant encounters on a daily basis.

Referring again to the operation of the system shown in FIG. 1, the trigger event module 118 of the processor 104 detects a trigger event based on at least one of the physiological data and vehicle data, the vehicle data received from the one or more vehicle systems of the vehicle. A "trigger event" as used herein can be a vehicle event or a health event (e.g., a health state) of the one or more vehicle occupants where further information about the health and status of the one or more vehicle occupants is needed. A trigger event can be an accident involving the vehicle. For example, the trigger event module 118 can detect a trigger event upon receiving a crash signal from the crash detection system 302.

As another illustrative example, a trigger event can be a vehicle occupant experiencing a heart attack. For example, the trigger event module 118 can detect a trigger event upon receiving and analyzing physiological data from a vehicle occupant (e.g., received from, for example, the wearable computing devices 128 and/or the vehicle sensors 124). The trigger event module 118 can compare the physiological data to pre-determined thresholds and/or normative data associated with the vehicle occupant.

For example, the trigger event module 118 can generate a query including physiological data (e.g., heart rate) and a vehicle occupant identification (e.g., recognition data, device ID from the wearable device associated with the vehicle occupant). The query can be executed at the medical database 130. The medical database 130 can return to the trigger event module normative baseline heart rate data for the vehicle occupant associated with the vehicle occupant identification. The trigger event module 118 can compare the normative baseline heart rate data to the physiological data (e.g., heart rate) to determine a trigger event. Accordingly, if heart rate indicates the vehicle occupant is experiencing a heart attack the trigger event module 118 detects a trigger event.

The vehicle data can be received from the one or more vehicle systems 122 and/or the vehicle sensors 124. For example, the VCD 102 can receive vehicle data from the vehicle systems 122 and/or the vehicle sensors 124. Vehicle data can include information related to the vehicle 200 of FIG. 2 and/or the vehicle systems 122 of FIG. 3. Exemplary vehicle data includes, but is not limited to, steering data, lane departure data, blind spot monitoring data, braking data, collision warning data, navigation data, collision mitigation data, auto cruise control data, vehicle model, vehicle make, vehicle identification number. Vehicle data can be obtained by the VCD 102, the vehicle systems 122 and/or the vehicle sensors 124.

Referring again to the operation of the system shown in FIG. 1, the health prioritization module 120 of the processor 104 determines a health state of each of the one or more vehicle occupants based on the physiological data. Generally, the term "health state," as used herein, can refer to a physiological state of the vehicle occupant. In particular, the health state describes a current condition of each of the one or more vehicle occupants. In some embodiments, the health state is a numerical or other kind of value for distinguishing between two or more physiological states. For example, the health state can be given as a percentage, a value between 1 and 10, a non-numerical value, a discrete state, a discrete value, a continuous value, among others.

The health prioritization module 120 of the processor 104 also determines a priority level for the health state of each of the one or more vehicle occupants. In some embodiments, the priority level is a numerical or other kind of value for distinguishing between two or more priority states. For example, the priority level can be given as a percentage, a value between 1 and 10, a non-numerical value, a discrete state, a discrete value, a continuous value, among others. The priority level identifies a level of importance with regards to the health state of each of the one or more vehicle occupants in relation to one another. For example, a health state indicating a very weak heart rate of a first vehicle occupant would be associated with a higher priority level than a health state indicating a normal heart rate of a second vehicle occupant. In one embodiment, the priority level is based on a severity of the health state.

In one embodiment, the health prioritization module 120 can determine a priority level by querying the medical database 130. For example, the health prioritization module 120 can generate a query with at least the health state and a vehicle occupant identification (e.g., recognition data, device ID from the wearable device associated with the vehicle occupant). The query can be executed by the health prioritization module 120 at the medical database 130. The medical database 130 can return information on the particular health state and/or a severity associated with the health state. Further, the medical database 130 can include priority level weights assigned to a particular health state, a severity of a health state, medical diseases, and health conditions. These weights can be used by the health prioritization module 120 to determine a priority level.

In some embodiments, the health prioritization module 120 and/or the data receiving module 116 can also determine the location of the one or more vehicle occupants in relation to the vehicle. In one embodiment, the health prioritization module 120 can triangulate the location of each wearable device 128 located in the vehicle. For example, the health prioritization module 120 can compare signal strength and/or timing measurements emitted by the wearable devices 128 and received by the VCD 102. In another embodiment, the health prioritization module 120 can receive position data from each of the wearable computing devices 128. For example, the wearable computing devices 128 can include position and motion sensors (e.g., GPS, accelerometer, magnetometer sensors integrated with the wearable computing devices 128) which provide position data to the health prioritization module 120. In this embodiment, the health prioritization module 120 can determine the location of the one or more vehicle occupant in relation to vehicle position data received from, for example, the position determination device 110.

In another embodiment, the health prioritization module 120 can utilize data from imaging devices in the vehicle (e.g., vehicle sensors 124) and/or on the wearable devices 128 to determine a location of a vehicle occupant in relation to the vehicle. For example, cameras located inside the vehicle can detect visible and infra-red light from the wearable devices 128. For example, the wearable devices 128 can emit a pattern of light unique to each wearable device 128. The cameras pick up the pattern of light in images and the images can be processed by the health prioritization module 120. The health prioritization module 120 can identify the pattern of light for each wearable device 128 relative to the vehicle and therefore identify the wearable device 128 and the location of the vehicle occupant associated with the wearable device 128.

Further, in some embodiments, cameras integrated with the wearable devices 128 can detect visible and infra-red light emitted from vehicle systems 122 (e.g., the interior light system 304) to determine a location of a vehicle occupant in relation to the vehicle. For example, the interior light system 304 can emit a pattern of light unique to area (e.g., passenger compartment) of the vehicle. The cameras of the wearable devices 128 can pick up the pattern of light in images and the images can be transmitted and processed by the health prioritization module 120. The health prioritization module 120 can identify the pattern of light for each wearable device 128 relative to the pattern emitted by the interior light system 304, and therefore identify the location of the vehicle occupant associated with the wearable device 128.

In another embodiment, the health prioritization module 120 can receive image data from cameras in the vehicle and/or cameras integrated with the wearable devices 128 and use the image data to identify the location of the vehicle occupant in relation to the vehicle For example, the health prioritization module 120 can identifying location markers in the image data with respect to the vehicle. In another example, the health prioritization module 120 can use the image data from cameras in the vehicle and/or cameras integrated with the wearable devices 128 to recreate a two or three dimensional scene of the vehicle. The health prioritization module 120 can use this rendering to identify the location of the vehicle occupants in the vehicle.

Further, in another example, a sensor integrated with the wearable devices 128 that indicates whether the wearable device 128 is on-body to a vehicle occupant can be used rectify false positive readings from the other methods described above. Thus, if a wearable device 128 is not on-body to a vehicle occupant, the location of the wearable device 128 and/or vehicle occupant (as determined by the methods above) can be filtered from the location calculations and thereby rectify the location of the vehicle occupant.

It is understood that in some embodiments, determining the location of a vehicle occupant can be determined concurrently with detecting a trigger event and/or a health event as described above. Further, the location and/or movement of the vehicle occupants can be stored (e.g., at a memory 106) and analyzed in real-time to track the location and/or the movement of the vehicle occupants after an accident and/or during a health event. Thus, the tracking can be used to maintain a location fix of each vehicle occupant and any movement that may occur. Additionally, this ensures that up-to-date information about the location and/or movement of the vehicle occupants can be communicated in real-time to vehicle control module 121 for controlling one or more vehicle systems.

As mentioned above, the systems discussed herein can determine a location and/or motion of a vehicle occupant relative to the vehicle. Thus, in some embodiments, the health prioritization module 120 can determine a motion state of each of the vehicle occupants based on motion data. For example, the health prioritization module 120 can receive motion data from each of the wearable computing devices 128 (e.g., from accelerometers integrated with the wearable computing devices 128). In another embodiment, the health prioritization module 120 can receive motion data from imaging devices (e.g., cameras) in the vehicle (e.g., vehicle sensors 124). It is understood that the processor 104 and/or the wearable computing devices 128 can also include gesture recognition capabilities to recognize gestures from the imaging data. Further, the methods described above for determining a location of a vehicle occupant and tracking the location/motion of a vehicle occupant can also be utilized to determine a motion state of each of the vehicle occupants.

As mentioned above, the health prioritization module 120 can determine a priority level. The priority level can be based, at least in part, on the location of the one or more vehicle occupants. Further, the priority level can also be based, at least in part, on a motion state of the one or more vehicle occupants and/or gestures of the one or more vehicle occupants. For example, in an emergency situation (e.g., a vehicle crash) a vehicle occupant who is located outside of the vehicle (e.g., has been thrown from the vehicle) and is not moving can have a health state with a higher priority level than a vehicle occupant located inside the vehicle who is moving.

In some embodiments, the health prioritization module 120 can use tiebreaker criteria to determine a priority level in the event that multiple vehicle occupants meet the same or similar priority level. Tiebreaker criteria can include attributes such as age, health conditions, and ability levels, among others. As an illustrative example, the health prioritization module 120 can determine a higher priority level for a vehicle occupant who is pregnant (e.g., determined based on medical profile data received from the medical database 130) than a vehicle occupant who is not pregnant.

As another illustrative example, the health prioritization module 120 can determine a higher priority level for a vehicle occupant who is a young child (e.g., determined based on medical profile data received from the medical database 130) than a vehicle occupant who is an adult. As a further illustrative example, the health prioritization module 120 can determine an ability level of the vehicle occupant and use the ability level as tiebreaker criteria to determine a priority level. An ability level can indicate how capable the vehicle occupant is able to respond to different scenarios, for example, how capable is the vehicle occupant to assist himself or herself in an emergency situation.

The ability level can be based on different attributes of the vehicle occupant, for example, age, responsiveness, location, movement, among others. Further, the ability level can be based on vehicle data received from the vehicle. As an illustrative example, the health prioritization module 120 can determine an ability level of a vehicle occupant who is an infant to be lower than an adult. As another illustrative example, a vehicle occupant located in a rear vehicle seat where the rear vehicle door located in proximity to the vehicle occupant is not operable (e.g., due to a vehicle crash) can be determined as having a lower ability level than a vehicle occupant located in a front vehicle seat, who is moving and the front vehicle door located in proximity to the vehicle occupant is operable.

Referring again to the operation of the system shown in FIG. 1, the vehicle control module 121 of the processor 104 controls one or more vehicle systems of the vehicle to provide an indication of the health state of each of the one or more vehicle occupants according to the priority level of the health state of each of the one or more vehicle occupants and a location of the one or more vehicle occupants. For example, the control module 121 can control an interior light system 304 to provide a visual cue of the health state of each vehicle occupant, wherein the visual cue has an appearance according to the priority level.

As an illustrative example, the visual cue can be a color emitted by the interior light system 304. Thus, the vehicle control module 121 can control the color of the interior vehicle cabin lights in the areas where the vehicle occupants are located based on the priority level. Accordingly, when a vehicle occupant has a priority level of 1 (e.g., the most severe), the vehicle control module 121 can control the color of the interior vehicle cabin light in an area around (e.g., proximate) the vehicle occupant to red. In some embodiments, the visual cue is a light intensity emitted by the interior light system 304.

As another illustrative example, the vehicle control module 121 can control the vehicle headlight and turn signal control system 306 to provide a visual cue of the health state of each vehicle occupant. For example, controlling the vehicle headlight and turn signal control system 306 can include activating one or more turn signals according to the priority level and the location of the one or more vehicle occupants. For example, in addition to activating the one or more turn signals, the vehicle control module 121 can control the pattern, intensity, and/or color of the one or more turn signals according to the priority level of the health state of each vehicle occupant and a location of the vehicle occupant.

In another embodiment, the vehicle control module 121 can control the audio system 308 to provide an audio cue of the health state of each vehicle occupant, wherein the audio cue has a sound according to the priority level. For example, the vehicle control module 121 can play an alert or adjust the content and/or volume of audio in an area around (e.g., proximate to the vehicle occupant or at a speaker proximate to the vehicle occupant) each vehicle occupant according to the priority level of the health state of each vehicle occupant and a location of the vehicle occupant.

Figure 6:
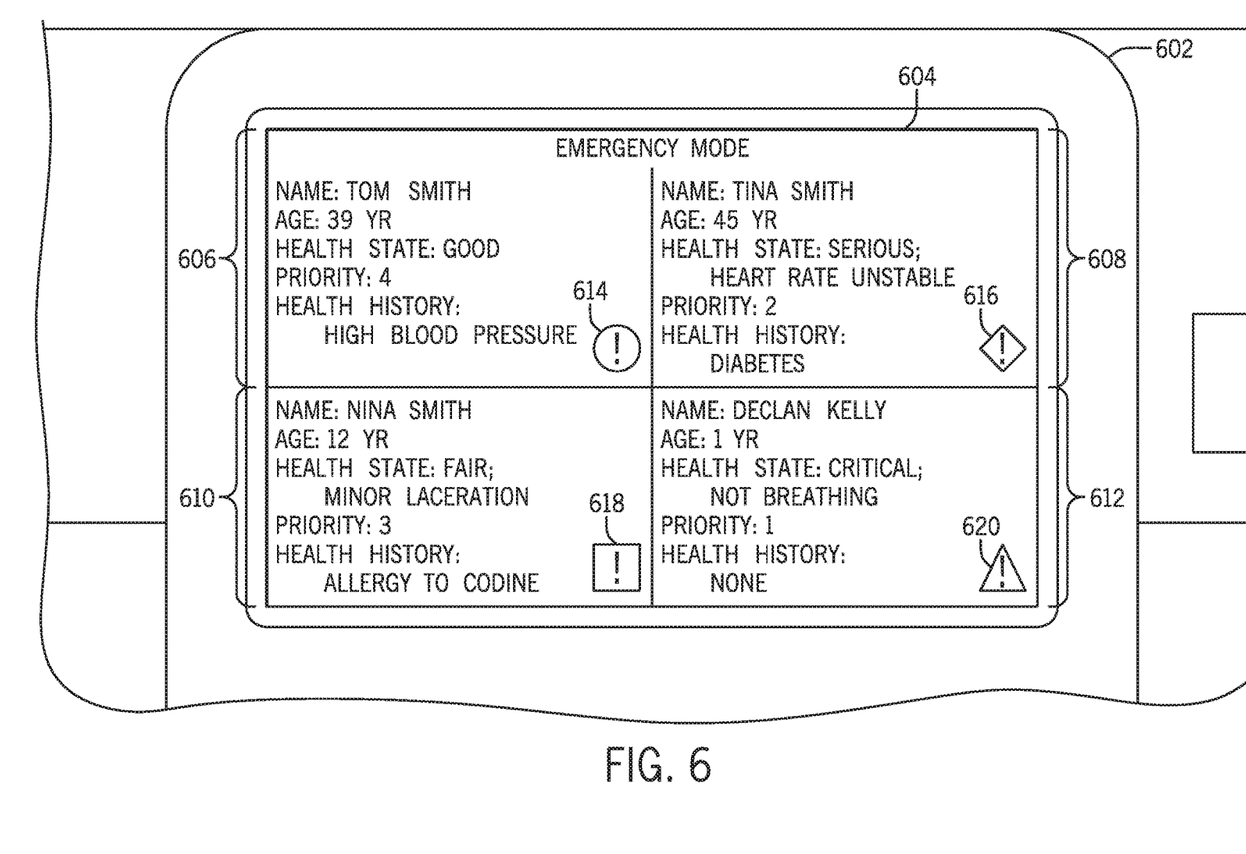
FIG. 6 is a schematic view of a vehicle display providing an indication of the health state of vehicle occupants according to an exemplary embodiment.

In a further embodiment, the vehicle control module 121 can control the vehicle infotainment system 310 to provide a visual display of the health state of each vehicle occupant on the display 312 of the vehicle infotainment system 310. An exemplary visual display is shown in FIG. 6, which will be described in further detail herein. In some situations, the display 312 may be damaged, for example, after a car accident. Upon determining the display 312 is damaged, the vehicle control 121 can also transmit a broadcast of the visual display to a first response system 132. In one embodiment, it is determined that the display 312 is damaged if the VCD 102 is unable to communicate with the infotainment system 310 and the display 312. In another embodiment, it is determined that the display 312 is damaged upon receiving a signal from the crash detection system 302 indicating the he infotainment system 310 and/or the display 312 is damaged.

It is appreciated that the data receiving module 116, and in particular the monitoring system 314 can continue to receive physiological data associated with each of the vehicle occupants and determine updated health states and updated priority levels. Accordingly, the vehicle control module 121 can alter control of the vehicle systems based on the updated health states and the updated priority levels. Thus, accurate information on the health of each vehicle occupant can be provided to first responders. The operation of the system shown in FIG. 1 will now be discussed in further detail in accordance with exemplary methods.

Figure 4:
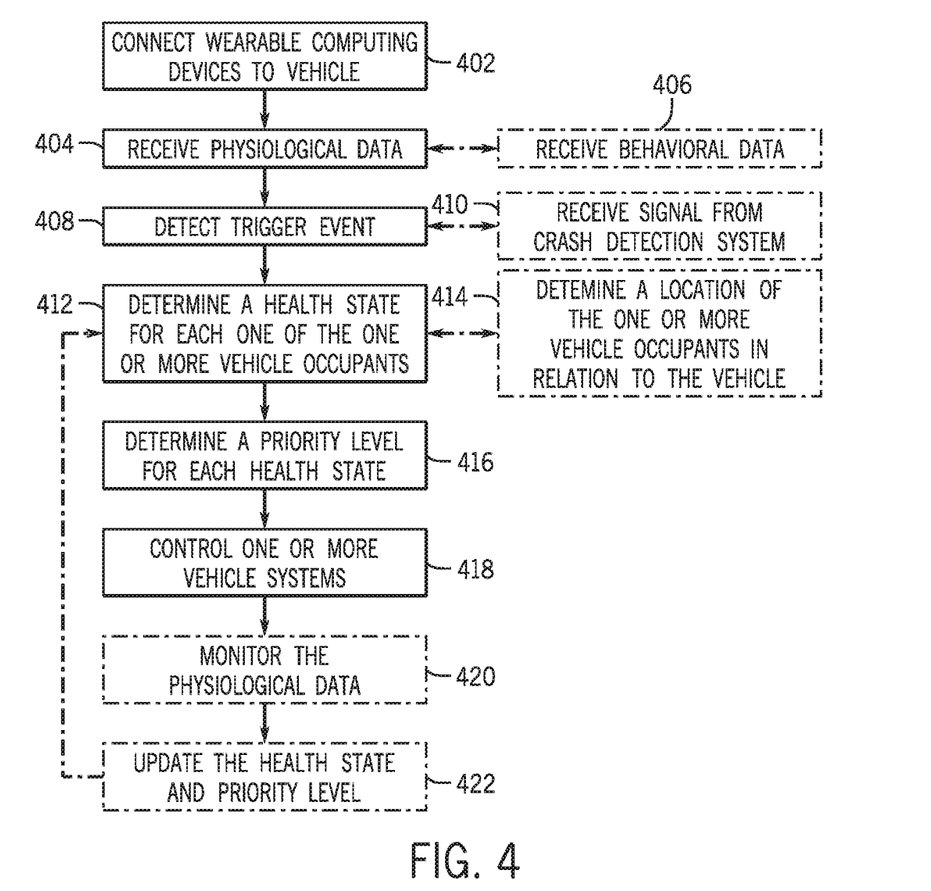
FIG. 4 is a process flow diagram of a method for vehicle control integrating health priority alerts of vehicle occupants according to an exemplary embodiment.

Referring now to FIG. 4, a method for vehicle control integrating health priority alerts of vehicle occupants according to an exemplary embodiment will be described. FIG. 4 will be described with reference to the components of FIGS. 1, 2 and 3. Additionally, FIG. 4 will be described with illustrative examples referring to FIGS. 5 and 6. It is understood that the illustrative examples discussed herein are exemplary in nature and that other vehicle occupants, health state, priority levels and vehicle control functions can be implemented.

With references to FIG. 4, at block 402, the method includes connecting one or more wearable computing devices, each associated with one or more vehicle occupants, to a vehicle. Thus, the method initializes a connection for computer communication between the one or more wearable computing devices, each associated with the one or more vehicle occupants, and the vehicle. In one embodiment, the VCD 102 detects the presence (e.g., polling) of one or more wearable computing devices 128 located in the vehicle and initiates an operable connection from the VCD 102 to the wearable computing device 128 for computer communication. In other embodiments, the wearable computing device 128 can initiate and automatically connect to the VCD 102 for computer communication, for example, upon detecting the presence of the VCD 102. The connection can be facilitated by various wired and wireless technologies, for example, near field communication, Bluetooth, WI-Fi, wired dongles, among others. Connection between the wearable computing device and the VCD 102 allows for bi-directional computer communication between the wearable computing devices and the VCD 102.

Figure 5:
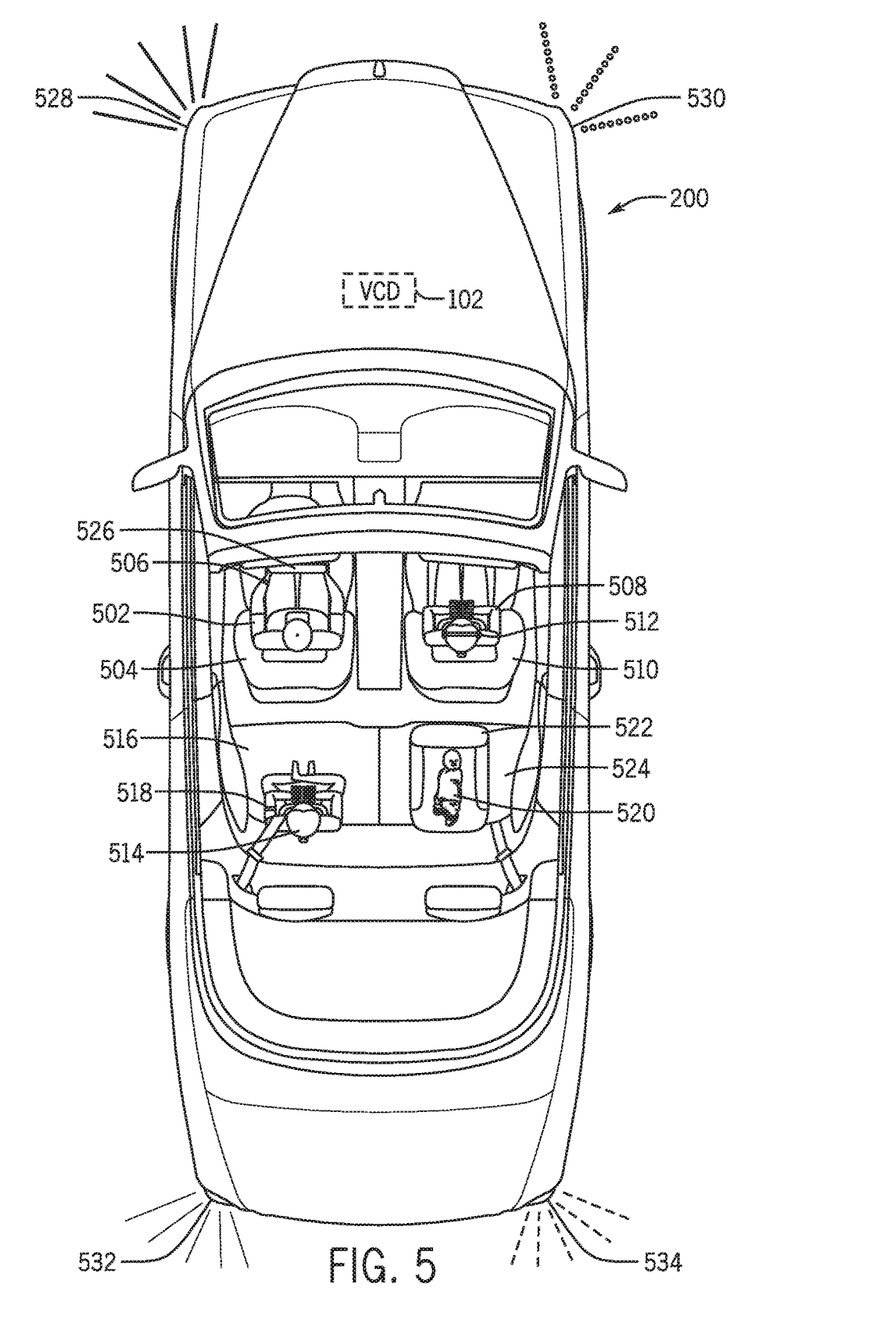
FIG. 5 is a schematic view of a vehicle with vehicle occupants, the vehicle implementing a system for vehicle control integrating health priority alerts of vehicle occupants according to an exemplary embodiment.

FIG. 2 illustrates a vehicle 200 showing one or more wearable computing devices that are each operably connected for computer communication to the VCD 102 according to an exemplary embodiment. Further, FIG. 5 illustrates a schematic view of the vehicle 200 according to an exemplary embodiment. In particular, in FIG. 5, the vehicle 200 includes a first vehicle occupant 502 located in a first vehicle seat 504. The first vehicle occupant 502 is associated with a first wearable computing device 506 (i.e., a watch). A second vehicle occupant 508 is located in a second vehicle seat 510. The second vehicle occupant 508 is associated with a second wearable computing device 512 (i.e., a headpiece). A third vehicle occupant 514 is located in a third vehicle seat 516. The third vehicle occupant 514 is associated with a third wearable computing device 516 (i.e., an armband). A fourth vehicle occupant 520 is located in a baby car seat 522 that is coupled to a fourth vehicle seat 524. In this embodiment, the baby car seat 522 can be the fourth wearable computing device (e.g., the baby car seat can include wearable computing device technology). In another embodiment, a blanket (not shown) including wearable computing device technology and covering the baby 520 can be the fourth wearable computing device. Each of the wearable computing devices shown in FIG. 5 are operably connected for computer communication to the VCD 102. It is understood that FIG. 5 is exemplary in nature and any number of vehicle occupants, other types of vehicle occupants, and other types of wearable computing devices can be implemented.

Referring again to the method of FIG. 4, at block 404, the method includes receiving physiological data associated with the one or more vehicle occupants from at least one of the one or more wearable computing devices and the vehicle. In some embodiments, at block 406, the method includes receiving behavioral data associated with the one or more vehicle occupants from at least one of the one or more wearable computing devices and the vehicle. As discussed above, with FIG. 1, the data receiving module 116 of the processor 104 can receive and/or access the physiological data and/or the behavioral data.

Referring to the illustrative example shown in FIG. 5, physiological data can be received at the VCD 102 from the first wearable computing device 506, the second wearable computing device 512, the third wearable computing device 518, and the baby car seat 522. As discussed above, in another embodiment, the vehicle 102 can include vehicle sensors (not shown in FIG. 5) for measuring and sensing physiological data associated with each of the vehicle occupants. For example, vehicle sensors for measuring and sensing physiological data associated with the first vehicle occupant 502 can be located in a steering wheel 526 and in various locations in and around the first vehicle seat 504. The VCD 102 can receive the physiological data from these sensors.

Referring again to FIG. 4, at block 408, the method includes detecting a trigger event based on at least one of the physiological data and vehicle data, the vehicle data received from one or more vehicle systems of the vehicle. As discussed above, a trigger event can be an accident involving the vehicle. For example, at block 410, the method can include receiving a signal from a crash detection system. The trigger event module 118 of the processor 104 can detect a trigger event based on the crash signal received from the crash detection system 302 of the vehicle.

As another example, a trigger event can be a vehicle occupant experiencing a health event. For example, the trigger event module 118 can compare the physiological data to pre-determined thresholds and/or normative data associated with the vehicle occupant. As discussed above, in one embodiment, the pre-determined thresholds and/or normative data can be retrieved by the trigger event module 118 from the medical database 130. As an illustrative example, a health event can be a heart attack, lack of oxygen, no heart rate, among others. Thus, the trigger event module 118 can detect a trigger event upon receiving and analyzing the physiological data thereby detecting at least one of the vehicle occupants is experiencing a health event.

At block 412, the method includes determining a health state of each of the one or more vehicle occupants based on the physiological data. In some embodiments, the health state is based on the behavioral data associated with the one or more vehicle occupants. The health state describes a current condition of each of the one or more vehicle occupants. As discussed above, a health state can refer to a physiological state of the vehicle occupant. In one embodiment, the health prioritization module 120 can determine a priority level by querying the medical database 130. For example, the health prioritization module 120 can generate a query with at least the health state and a vehicle occupant identification (e.g., recognition data, device ID from the wearable device associated with the vehicle occupant). The query can be executed by the health prioritization module 120 at the medical database 130. The medical database 130 can return information on the particular health state and/or a severity associated with the health state. Further, the medical database 130 can include priority level weights assigned to a particular health state, a severity of a health state, medical diseases, and health conditions. These weights can be used by the health prioritization module 120 to determine a priority level.

Referring again to FIG. 4, at block 414, the method includes determining a location of the one or more vehicle occupants in relation to the vehicle. The location of the one or more vehicle occupants can be determined from information from the wearable computing devices and/or the vehicle. In one embodiment, the health prioritization module 120 can receive position data from each of the wearable computing devices. For example, the wearable computing devices 128 can include position and motion sensors (e.g., GPS, accelerometer, magnometer sensors integrated with the wearable computing devices 128) which provide position data to the health prioritization module 120. In this embodiment, the health prioritization module 120 can determine the location of the one or more vehicle occupant in relation to vehicle position data received from, for example, the position determination device 110.

In another embodiment, the health prioritization module 120 can utilize data from imaging devices in the vehicle (e.g., vehicle sensors 124) to determine a location of a vehicle occupant in relation to the vehicle. For example, the health prioritization module 120 can receive image data from cameras in the vehicle and use the image data to identify the location of the vehicle occupant in relation to the vehicle (e.g., identifying location markers in the image data with respect to the vehicle). In another example, the health prioritization module 120 can receive image data from imaging devices integrated with the wearable computing devices 128. For example, the wearable computing devices 128 can include cameras that capture image data and the health prioritization module 120 can receive the image data from the wearable computing devices 128.

Further, the method can include determining a motion state (e.g., moving, not moving, slight movement, direction of movement) of the one or more vehicle occupants. For example, the health prioritization module 120 can determine a motion state of each of the vehicle occupants based on motion data. For example, the health prioritization module 120 can receive motion data from each of the wearable computing devices 128 (e.g., from accelerometers integrated with the wearable computing devices 128). In another embodiment, the health prioritization module 120 can receive motion data from imaging devices (e.g., cameras) in the vehicle (e.g., vehicle sensors 124). It is understood that the processor 104 and/or the wearable computing devices 128 can also include gesture recognition capabilities to recognize gestures from the imaging data.

Referring again to the method of FIG. 4, at block 416, the method includes determining a priority level for the health state of each of the one or more vehicle occupants. In one embodiment, determining the priority level includes determining the priority level based on a severity of the health state. As discussed above, the health prioritization module 120 of the processor 104 can determine a priority level for the health state of each of the one or more vehicle occupants. The priority level identifies a level of importance with regards to the health state of each of the one or more vehicle occupants in relation to one another. For example, a health state indicating low oxygen content of a first vehicle occupant would be associated with a higher priority level than a health state indicating a normal oxygen content of a second vehicle occupant. As discussed above, in some embodiments, the health prioritization module 120 can determine a priority level for the health state of each of the one or more vehicle occupants by querying the medical database 130 with the health state.

At block 418, the method includes controlling one or more vehicle systems of the vehicle to provide an indication of the health state according to the priority level of the health state and a location of each of the one or more vehicle occupants. More specifically, vehicle systems are controlled according to the priority level of the health state and the location of each of the one or more vehicle occupants. In one embodiment, the vehicle control module 121 of the processor 104 transmits one or more vehicle commands to the vehicle 102 to control one or more vehicle systems 122 of the vehicle 102, thereby providing an indication of the health state according to the priority level of the health state and a location of the one or more vehicle occupants. Accordingly, a first responder, for example, can be notified of a priority level of a vehicle occupant and the location of the vehicle occupant.

In one embodiment, the one or more vehicle systems is an interior light system for providing a visual cue of the health state of each vehicle occupant, wherein the visual cue has an appearance according to the priority level. For example, the vehicle control module 121 of the processor 104 can control the interior light system 304 to provide a visual cue of the health state of each vehicle occupant, wherein the visual cue has an appearance according to the priority level. The visual cue can be a color emitted by the interior light system 304. In other embodiments, the visual cue is a light intensity emitted by the interior light system 304.

As an illustrative example and with reference to FIG. 5, vehicle cabin lights (not shown) of the interior light system 304 can be located in areas around each of the vehicle occupants. Based on the priority level of the health state of each of the vehicle occupants and the location of the vehicle occupants, the vehicle control module 121 can control the vehicle cabin lights (e.g., via the interior light system 304) to provide a visual cue of the health state of each vehicle occupant. Thus, in this example, the first vehicle occupant 502 has a priority level of 4, the second vehicle occupant 508 has a priority level of 2, the third vehicle occupant 514 has a priority level of 3, and the fourth vehicle occupant 520 has a priority level of 1, where the priority level of 1 is the most severe. Accordingly, the vehicle control module 121 can control vehicle cabin lights in an area around the fourth vehicle occupant 520 to turn to a color red, vehicle cabin lights in an area around the second vehicle occupant 508 to turn to a color orange, vehicle cabin lights in an area around the third vehicle occupant 514 to turn to a color yellow, and vehicle cabin lights in an area around the first vehicle occupant 502 to turn to a color green. Thus, in this example, a first responder can easily perceive the health state and the location of each vehicle occupant. It is appreciated that other parameters of the vehicle cabin lights can be controlled. For example, a light pattern, an intensity, among others.

In another embodiment, the one or more vehicle systems is a vehicle headlight and turn signal control system for providing a visual cue of the health state of each vehicle occupant. For example, the vehicle control module 121 can control the vehicle headlight and turn signal control system 306 to provide a visual cue of the health state of each vehicle occupant, wherein the visual cue has an appearance according to the priority level. In one embodiment, controlling the vehicle headlight and turn signal control system 306 can include activating one or more turn signals according to the priority level and the location of the one or more vehicle occupants.

Referring again to the illustrative example shown in FIG. 5, the vehicle 200 includes a front left headlight 528, a front right headlight 530, a rear left headlight 532, and a rear right headlight 534. Each headlight can also include turn signal components. In this embodiment, the vehicle control module 121 can control parameters of each headlight (e.g., via the turn signal control system 306). For example, a flashing pattern, a light color, a light intensity, a combination-flashing pattern of the headlight and the turn-signal component, among others. The control of each headlight is based on the priority level of the health state and the location of each of the vehicle occupants. Thus, the indication of the priority level of the health level corresponds to the location of the vehicle occupant with said health level. As shown in FIG. 5, each headlight is producing a different light pattern according to the priority level of the health state and the location of each of the vehicle occupants.

In a further embodiment, the one or more vehicle systems is an audio system for providing an audio cue of the health state of each vehicle occupant, wherein the audio cue has a sound according to the priority level. For example, the vehicle control module 121 can control the audio system 308 to provide an audio cue of the health state of each vehicle occupant, wherein the audio cue has a sound according to the priority level. Further, in some embodiments, the audio cue is controlled according to the location of the one or more vehicle occupants. The content of the sound can be controlled as well as other parameters, for example, volume level, bass level, among others.

As an illustrative example, the vehicle control module 121 can control the audio system 308 to provide sound content according to the priority level to speakers (not shown) located in areas around (e.g., proximate) the vehicle occupant with a health state corresponding to said priority level. Referring to FIG. 5, the vehicle control module 121 can control speakers (not shown) in an area around the fourth vehicle occupant 520 to play a loud siren sound speakers (not shown). In an area around the second vehicle occupant 508, the audio system 308 can play an intermittent beeping sound. In area around the third vehicle occupant 514, the audio system 308 can play a low bass sound, further, in an area around the first vehicle occupant 502; the audio system can play a soft chime sound. Thus, a first responder, for example, can be notified of a priority level of a vehicle occupant and the location of the vehicle occupant based on the audio cue.

In another embodiment, the one or more vehicle systems is a vehicle infotainment system for providing a visual display of the health state of each vehicle occupant on a display of the vehicle infotainment system. For example, the vehicle control module 121 can control the infotainment system 310 to provide a visual display of the health state of each vehicle occupant on the display 312 of the vehicle infotainment system 310. FIG. 6 is a schematic view of a display (e.g., the display 312) displaying information about vehicle occupants in a vehicle implementing a system for vehicle control integrating health priority alerts of vehicle occupants according to an exemplary embodiment. In FIG. 6, the display 602 includes a user interface 604. As can be seen, a visual display is shown on the user interface 604 displaying the health state of each vehicle occupant and other information for each vehicle occupant. In particular, in FIG. 6, the information 606 is associated with the first vehicle occupant 502, the information 608 is associated with the second vehicle occupant 508, the information 610 is associated with the third vehicle occupant 512, and the information 612 is associated with the fourth vehicle occupant 520.

In some embodiments, the visual display shown on the user interface 604 can show the location of each vehicle occupant in the vehicle. For example, in FIG. 6, the information is displayed according to the location of each vehicle occupant. In another embodiment, not shown, the visual display can include a diagram of the vehicle seats and indicate which vehicle occupant is located in each vehicle seat. Additionally, the vehicle control module can generate and control the display 602 to display visual indications on the user interface 604 according to the priority level of the health state or each vehicle occupant. For example, in FIG. 6, icons 614, 616, 618, 620 are displayed according to the priority level of each of the vehicle occupants. Thus, a first responder, for example, can view the user interface 604 and recognize a priority level of a vehicle occupant and the location of the vehicle occupant based on the visual cues.

In some embodiments, the display 602 can be damaged and unable to provide a visual display as shown in FIG. 6. For example, the display 602 can be damaged after an accident. Thus, is some embodiments, the visual display can be transmitted to a first response system 132, for example via the network 126. In one embodiment, the visual display is transmitted via a broadcast to a first response system 132 upon determining the display is damaged. The vehicle control module 121 can determine the display is damaged based on communication from the infotainment system 310. For example, if the vehicle control module 121 is unable to communication with the infotainment system 310 and/or the display 312, the vehicle control module determines the display is damaged. In another embodiment, it is determined that the display 312 is damaged upon the vehicle control module 121 receiving a signal from the crash detection system 302 indicating the he infotainment system 310 and/or the display 312 is damaged.

Referring again to the method of FIG. 4, at block 420, the method includes monitoring the physiological data. For example, the data receiving module 116 of the processor 104 can continue to receive physiological data from at least one of the one or more wearable computing devices and the vehicle. If a change has occurred in the physiological data, at block 422, the method includes updating the health state and the priority level, and returns to block 412. Accordingly, the vehicle control module 121 can alter control of the vehicle systems based on the updated health state and the updated priority levels. Thus, accurate information on the health of each vehicle occupant can be provided to first responders.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling a vehicle, comprising:
   receiving physiological data from one or more wearable computing devices, wherein each of the one or more wearable computing devices is associated with one or more vehicle occupants in the vehicle;
   determining a health state of the one or more vehicle occupants based on the physiological data, the health state describing a current condition of each of the one or more vehicle occupants;
   determining a priority level for the health state of each of the one or more vehicle occupants; and
   controlling one or more vehicle systems of the vehicle based on the health state of each of the one or more vehicle occupants and according to the priority level of the health state of each of the one or more vehicle occupants.

2. The computer-implemented method of claim 1, wherein the priority level is based on a location of each of the one or more vehicle occupants.

3. The computer-implemented method of claim 1, wherein the priority level is based on an ability level of each of the one or more vehicle occupants.

4. The computer-implemented method of claim 1, wherein controlling the one or more vehicle systems of the vehicle further includes controlling the one or more vehicle systems of the vehicle based on the health state of each of the one or more vehicle occupants and according to the priority level and a location of each of the one or more vehicle occupants.

5. The computer-implemented method of claim 1, further including receiving behavioral data associated with the one or more vehicle occupants from at least one of the one or more wearable computing devices and the one or more vehicles systems of the vehicle, wherein determining the health state of each of the one or more vehicle occupants is based on the behavioral data associated with the one or more vehicle occupants.

6. The computer-implemented method of claim 1, further including detecting a trigger event based on at least one of the physiological data and vehicle data, wherein the vehicle data is received from the one or more vehicle systems of the vehicle, and upon detecting the trigger event, determining the health state of the one or more vehicle occupants.

7. The computer-implemented method of claim 1, wherein the one or more vehicle systems is an interior light system for and controlling the one or more vehicle systems includes controlling the interior light system to provide a visual cue based on the health state of each of the one or more vehicle occupants and according to the priority level of each of the one or more vehicle occupants.

8. The computer-implemented method of claim 1, wherein the one or more vehicle systems is a vehicle headlight and turn signal control system for providing a visual cue of the health state of the one or more vehicle occupants and according to the priority level of each of the one or more vehicle occupants.

9. The computer-implemented method of claim 1, wherein the one or more vehicle systems is a vehicle infotainment system for providing a visual display of the health state of each of the one or more vehicle occupants on a display of the vehicle infotainment system.

10. The computer-implemented method of claim 9, wherein controlling the one or more vehicle systems further includes transmitting a broadcast of the visual display to a first response system upon determining the display is damaged.

11. A system for controlling a vehicle, comprising:
one or more wearable computing devices each associated with one or more vehicle occupants;
a vehicle including one or more vehicle systems, one or more vehicle sensors and a processor, the processor operably connected for computer communication to the one or more wearable computing devices;
a data receiving module of the processor receives physiological data associated with the one or more vehicle occupants from at least one of the one or more wearable computing devices and the one or more vehicle sensors;
a health prioritization module of the processor determines a health state of each of the one or more vehicle occupants based on the physiological data, the health state describing a current condition of each of the one or more vehicle occupants, and determines a priority level for the health state of each of the one or more vehicle occupants; and
a vehicle control module of the processor controls the one or more vehicle systems of the vehicle according to the priority level of the health state of the one or more vehicle occupants.

12. The system of claim 11, further including a trigger event module of the processor detects a trigger event based on at least one of the physiological data and vehicle data, the vehicle data received from the one or more vehicle systems of the vehicle.

13. The system of claim 11, wherein the health prioritization module further determines a location of the one or more vehicle occupants in relation to the vehicle.

14. The system of claim 11, wherein the vehicle control module of the processor further controls the one or more vehicle systems of the vehicle according to the priority level of the health state of the one or more vehicle occupants and a location of the one or more vehicle occupants.

15. The system of claim 11, wherein the one or more vehicle systems is an interior light system and the vehicle control module controls the interior light system to provide a visual cue of the health state of each vehicle occupant, wherein the visual cue has an appearance according to the priority level of the health state.

16. The system of claim 11, wherein the one or more vehicle systems is a vehicle headlight and turn signal control system and the vehicle control module controls the vehicle headlight and turn signal control system to activate one or more turn signals according to the priority level of the health state.

17. A non-transitory computer-readable storage medium storing instructions
that, when executed by a computer, causes the computer to perform a method comprising:
initializing a connection for computer communication between one or more wearable computing devices, each associated with one or more vehicle occupants, and a vehicle;
receiving physiological data associated with the one or more vehicle occupants from at least one of the one or more wearable computing devices and vehicles sensors of the vehicle;
determining a health state of each of the one or more vehicle occupants based on the physiological data, the health state describing a current condition of each of the one or more vehicle occupants;
determining a priority level of each of the health states of each of the one or more vehicle occupants; and
transmitting one or more vehicle commands to the vehicle to control one or more vehicle systems based on the health state according to the priority level of the health state.

18. The non-transitory computer-readable storage medium of claim 17, further including detecting a trigger event based on at least one of the physiological data and vehicle data, the vehicle data received from one or more vehicle systems of the vehicle.

19. The non-transitory computer-readable storage medium of claim 17, wherein transmitting the one or more vehicle commands includes transmitting the one or more vehicle commands to the vehicle to control the one or more vehicle systems based on the health state according to the priority level of the health state and a location of the one or more vehicle occupants.

20. The non-transitory computer-readable storage medium of claim 17, wherein transmitting the one or more vehicle commands further includes transmitting the one or more vehicle commands to an interior light system thereby controlling the interior light system to provide a visual cue of the health state of each vehicle occupant, wherein the visual cue has an appearance according to the priority level of the health state.

* * * * *